United States Patent [19]
Reddy

[11] Patent Number: 6,081,279
[45] Date of Patent: Jun. 27, 2000

[54] SHARED MEMORY GRAPHICS ACCELERATOR SYSTEM

[75] Inventor: Chitranjan N. Reddy, Milpitas, Calif.

[73] Assignee: Alliance Semiconductor Corporation, San Jose, Calif.

[21] Appl. No.: 08/955,105

[22] Filed: Oct. 21, 1997

Related U.S. Application Data

[63] Continuation of application No. 08/136,553, Oct. 14, 1993, Pat. No. 5,712,664.

[51] Int. Cl.⁷ ...................................................... G06F 15/76
[52] U.S. Cl. ............................ 345/519; 345/503; 345/508
[58] Field of Search ................................... 345/132, 133, 345/501, 508, 519, 507, 511, 509, 503, 512, 502; 711/106

[56] References Cited

U.S. PATENT DOCUMENTS

| | | | |
|---|---|---|---|
| 4,191,956 | 3/1980 | Groothuis | 340/789 |
| 4,228,528 | 10/1980 | Cenker et al. | 365/200 |
| 4,812,836 | 3/1989 | Kurakake et al. | 340/724 |
| 4,816,815 | 3/1989 | Yoshiba | 340/750 |
| 4,951,232 | 8/1990 | Hannah | 364/522 |
| 4,956,708 | 9/1990 | Itagaki | 358/140 |
| 5,008,838 | 4/1991 | Kelleher et al. | 345/508 |
| 5,031,092 | 7/1991 | Edwards et al. | 364/200 |
| 5,083,294 | 1/1992 | Okajima | 365/200 |
| 5,202,962 | 4/1993 | Matsuo et al. | 395/166 |
| 5,258,843 | 11/1993 | Truong | 358/183 |
| 5,293,540 | 3/1994 | Trani et al. | 348/584 |
| 5,297,148 | 3/1994 | Harari et al. | 371/10.2 |
| 5,303,334 | 4/1994 | Snyder et al. | 395/109 |
| 5,319,388 | 6/1994 | Mattison et al. | 345/190 |
| 5,321,806 | 6/1994 | Meinerth et al. | 395/162 |
| 5,363,500 | 11/1994 | Takeda | 395/425 |
| 5,386,573 | 1/1995 | Okamoto | 395/725 |
| 5,392,393 | 2/1995 | Deering | 395/162 |
| 5,396,586 | 3/1995 | Van Aken | 395/141 |
| 5,402,147 | 3/1995 | Chen et al. | 345/115 |
| 5,461,679 | 10/1995 | Normile et al. | 345/502 |
| 5,491,769 | 2/1996 | Moller | 345/439 |
| 5,515,076 | 5/1996 | Thompson et al. | 345/502 |
| 5,537,128 | 7/1996 | Keene et al. | 345/89 |
| 5,572,655 | 11/1996 | Tuljapurkar et al. | 345/519 |
| 5,694,143 | 12/1997 | Fielder et al. | 345/509 |

FOREIGN PATENT DOCUMENTS 4-211293  8/1992  Japan .............................. G09G 5/00

OTHER PUBLICATIONS

"TRS–80™ Color Computer Technical Reference Manual", Tandy, pp. 17–21, 1981.
"TMS34010 User's Guide", Texas Instruments, pp. 1–5 through 1–7, 1986.
"IBM™ Technical Disclosure Bulletin", IBM Corp., vol. 35, No. 1A, Jun. 1992.

*Primary Examiner*—Kee M. Tung
*Attorney, Agent, or Firm*—Finnegan, Henderson, Farabow, Garrett & Dunner L.L.P.

[57] ABSTRACT

A shared memory graphics accelerator system that provides graphics display data to a display includes a central processing unit for generating graphics display data and graphics commands for processing the display data. An integrated graphics display memory element includes both a graphics accelerator connected to receive display data and graphics commands from the central processing unit and an on-ship frame buffer memory element. The on-chip frame buffer memory element is connected to receive display data from the graphics accelerator via a display data distribution bus. An off-chip frame buffer memory element is also connected to the display data distribution bus to receive display data from the graphics accelerator. The graphics accelerator selectively distributes display data to the on-chip frame buffer memory element and to the off-chip frame buffer memory element based on predetermined display data distribution criteria.

11 Claims, 2 Drawing Sheets

SHARED MEMORY GRAPHICS ACCELERATOR SYSTEM

This is a continuation of application Ser. No. 08/136,553, filed Oct. 14, 1993 now U.S. Pat. No. 5,712,664.

BACKGROUND OF THE INVENTION

1. Field of the Invention

The present invention relates to the visual display of a computer graphics image and, in particular, to a graphics display system that integrates both a graphics accelerator engine and a portion of the graphics frame buffer memory on the same monolithic chip.

2. Discussion of the Prior Art

A video graphics system typically uses either VRAM or DRAM frame buffers to store the pixel display data utilized in displaying a graphics or video image an a display element such as a CRT.

A VRAM frame buffer includes two ports that are available for the pixel data to flow from the memory to the display. One port is known as the serial port and is totally dedicated to refreshing the display screen image. The other port is a random access port that is used for receiving pixel updates generated by a CPU or a graphics accelerator engine. A typical VRAM arrangement allocates 99% of the available bandwidth to the random port thereby allowing the system to display fast moving objects and to support large display CRTs.

However, in a DRAM-based video system, the pixel data updates and the screen refresh data contend for a single frame buffer memory port. This contention reduces the amount of bandwidth available for pixel data updates by the CPU and the graphics engine, resulting in a lower performance graphics display system.

However, in most applications the DRAM solution is preferable to the VRAM solution at the expense of lower performance, because DRAMs are cheaper than VRAMs.

FIG. 1 shows a conventional graphics display system 10 wherein a CPU 12 writes pixel display data on data bus 11 to be displayed on the CRT screen 14 through a graphics accelerator (GXX) 16 onto a DRAM frame buffer 18 via data bus 19. The CPU 12 also provides certain higher level graphics command signals 20 to the graphics accelerator 16 to manipulate the display data stored in the DRAM frame buffer 18.

The graphics accelerator 16 retrieves display data from the frame buffer 18 via data bus 19 utilizing reference address bus 21, processes the retrieved display data based on the CPU command signals 20 and writes the new pixel data back to the frame buffer 18.

The pixel data is displayed on the CRT 14 through a random access memory digital-to-analog converter (RAMDAC) 22 that receives the data via a data display bus 24.

The graphics accelerator 16 also constantly reads display data from the frame buffer 18 via data bus 19 and sends it to the RAMDAC 22 via the data display bus 24 to meet the refresh requirements of the CRT display 14.

Thus, as illustrated in FIG. 1, the bandwidth of the data bus 19 is shared by three functions: display refresh, CPU display data update, and graphics accelerator display manipulation. As the display size (i.e., the number of pixels to be displayed on the CRT screen 14) increases, the display updates and display manipulation functions are reduced because of the bandwidth limitations of the data bus 19 caused by the fixed refresh requirements of the CRT 14.

While these limitations can be addressed by increasing the data bus width or by increasing its speed, both of these solutions have either physical or practical limitations. Increasing the bus width increases the silicon area and the package pin count. Increasing the speed of the bus requires utilization of more complex silicon process technology.

SUMMARY OF THE INVENTION

The present invention provides a graphics display system that enhances performance by integrating a portion of the frame buffer storage space and the graphics accelerator engine on the same chip while at the same time maintaining the flexibility to expand the frame buffer size as needed.

Generally, the present invention provides a shared memory graphics accelerator system that provides display data to a display element. The shared memory graphics accelerator system-includes a central processing unit that generates both display data and graphics commands for processing the display data. An integrated graphics display memory element includes both a graphics accelerator that receives display data and graphics commands from the central processing unit and an on-chip frame buffer memory element that is connected to receive display data from the graphics accelerator via a display data distribution bus. An off-chip frame buffer memory element is also connected to the data distribution bus to receive display data from the graphics accelerator. The graphics accelerator selectively distributes the display data to the on-chip memory element and to the off-chip memory element based on predefined display data distribution criteria.

The above-described integrated solution increases the performance of the graphics display system because display data retrieval from the on-chip frame buffer is much faster than from an external frame buffer and the DRAM timing constraints are reduced, thus achieving improved system performance. This integrated solution also allows the display memory size to be expanded by adding external memory so that large displays can be accommodated on an as-needed basis. Also, the frame buffer space can be distributed among several integrated solutions, thereby increasing both the display bandwidth and the parallel processing capability between the CRT display and the CPU.

A better understanding of the features and advantages of the present invention will be obtained by reference to the following detailed description and accompanying drawings which set forth an illustrative embodiment in which the principals of the invention are utilized.

DETAILED DESCRIPTION OF THE INVENTION

The present invention addresses the data bus bandwidth problem common to conventional DRAM-based graphics display systems by integrating a portion of the display data frame buffer memory space on the graphics accelerator chip and thereby allowing simultaneous access to both on-chip DRAM frame buffer data and off-chip DRAM frame buffer data while maintaining the flexibility to increase the display data memory size externally to meet a variety of CRT display size requirements.

Figure 1:
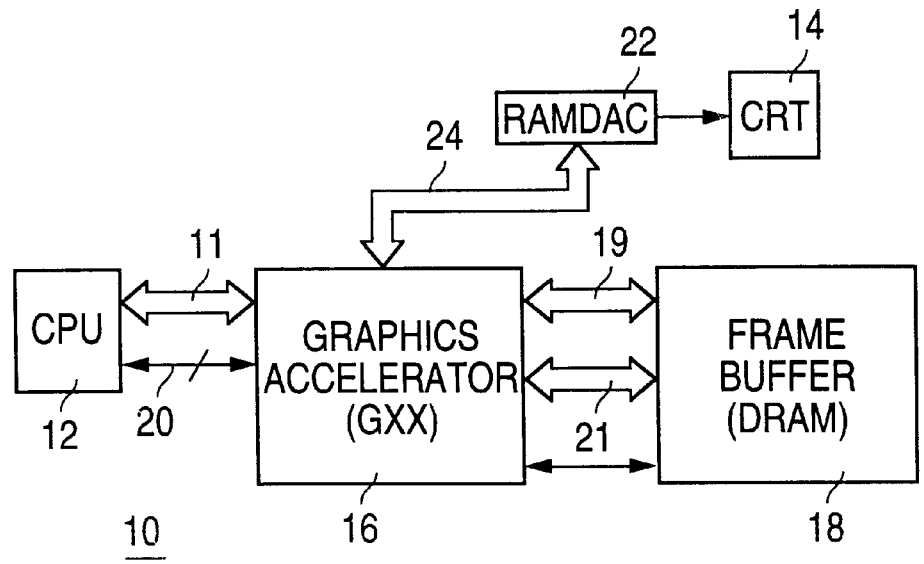
FIG. 1 is a schematic diagram illustrating a conventional graphics subsystem.
Figure 2:
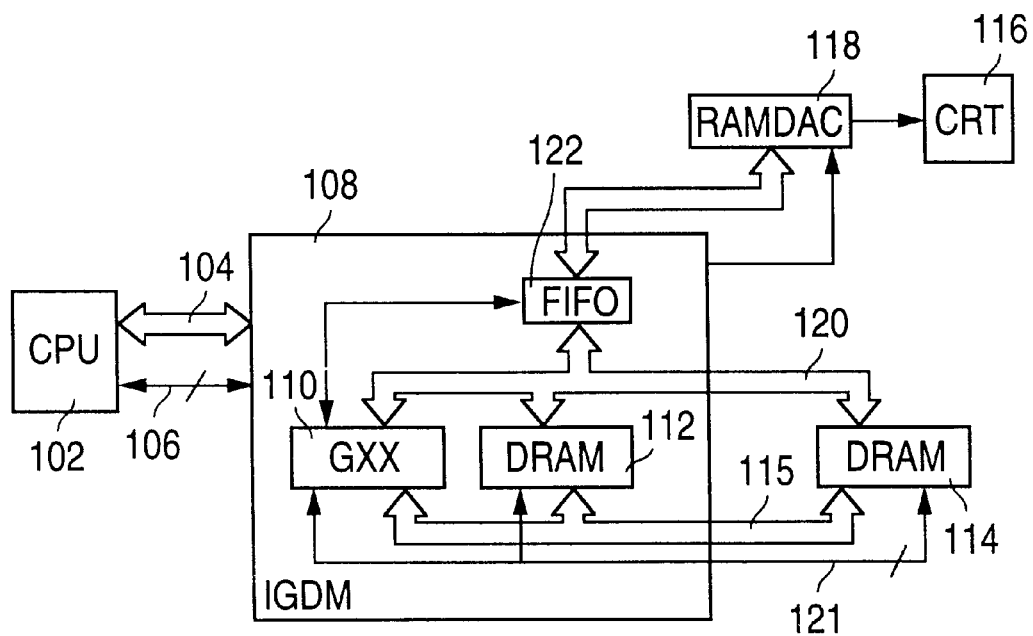
FIG. 2 is a schematic diagram illustrating a shared memory graphics accelerator system in accordance with the present invention.

FIG. 2 shows a shared memory graphics accelerator system 100 that includes a central processing unit (CPU) 102 that sends pixel display data via address/data bus 104 and graphics command signals via a control bus 106 to a single integrated graphics display memory (IGDM) 108. Those skilled in the art will appreciate that the bus widths are CPU-dependent.

The integrated graphics display memory element 108 includes a graphics accelerator 110 that receives the pixel display data and distributes it between an on-chip DRAM frame buffer 112 and an off-chip DRAM frame buffer 114 via a display data distribution bus 120, using a common address bus 115. The data distribution between on-chip memory 112 and off-chip memory 114 is based upon user defined criteria loaded onto the integrated graphics display memory element 108 during power-up. This information can be stored either in the CPU hard disk or in a boot-up EPROM. This distribution of the pixel display data is optimized for maximum CPU updates onto the on-chip display buffer DRAM 112 and the off-chip DRAM 114 and, at the same time, for supporting a maximum display size refresh on the CRT display 116.

By splitting the display frame buffer into an on-chip DRAM portion 112 and an off-chip DRAM portion 114, the graphics accelerator engine 110 can double the pixel read data to a RAMDAC 118 by simultaneously accessing on-chip and off-chip frame buffer display data and multiplexing it onto the distributed data bus 120 using control signals 121. A FIFO memory 122 provides a buffer between the RAMDAC 118 which requires continuous display data input and the distributed data bus 120, which is shared for display update, display manipulate and display refresh operations.

It is also possible for the graphics accelerator engine 110 to read on-chip DRAM 112 at a much faster rate that it can read off-chip DRAM 114, thereby making more CPU 102 update time available for on-chip DRAM 112. This increase in CPU update bandwidth can, for example, be translated into a faster moving image portion which can be stored onto the on-chip DRAM 112 and a slower moving portion which can be stored onto the off-chip DRAM 114. Those skilled in the art will appreciate that this distribution of the load can be implemented many different ways between the on-chip DRAM 112 and the off-chip DRAM 114 to meet the performance requirements of the total graphics display system.

Those skilled in the art will also appreciate that successful implementation of the integrated graphics display memory element 108 described above requires that the on-chip DRAM frame buffer 112 have substantially different characteristics than a monolithic DRAM used for data storage.

A typical monolithic DRAM requires a 200 nsec. refresh cycle every 15.6 μsec., which is equivalent to a 1.28% refresh overhead. During this refresh time, no data may be read from the DRAM; the time is used primarily for refreshing the DRAM cell data. This refresh overhead time needs to be constant (or as small as possible) with increasing chip density. Unfortunately, chip power dissipation must be increased with increasing chip density in order to maintain constant overhead.

For the integrated graphics display memory element 108, the on-chip DRAM frame buffer memory 112 is implemented with substantially increased refresh frequency (much less than 15.6 μsec.) to reduce the on-chip power dissipation. For example, a 16 Mbit on-chip DRAM frame buffer memory 112 could have one 200 nsec. refresh cycle every 2 usec., which translates to a 10% refresh overhead. While this refresh overhead is a significant portion of the total available bandwidth, with improved on-chip DRAM access time resulting from integration of the DRAM 112 with the graphics accellerator 110, overall system performance is improved significantly. Those skilled in the art will appreciate that, as more of the system sub-blocks, such as the RAMDAC 118, are integrated with the graphics accelerator 110 and the on-chip DRAM frame buffer memory 112, the refresh overhead is optimized with respect to improved on-chip DRAM access time and increased on-chip power dissipation to provide improved total system performance. Furthermore, increased refresh frequency permits smaller memory storage cell capacitance which reduces total chip size.

Thus, the on-chip DRAM 112 has a substantially higher refresh frequency than the monolithic off-chip DRAM 114. The integrated graphics display memory element 108 includes means for supporting the multiple refresh frequency requirements of the on-chip DRAM 112 and the off-chip DRAM 114.

In some low power applications, average power dissipation can be reduced by increasing both the memory cell size and the refresh interval. Another way to reduce power is to increase the number of DRAM sense amplifiers, but this solution increases chip size.

Those skilled in the art will appreciate that the FIG. 2 configuration of system 100 can be implemented utilizing available integrated circuit technology.

Figure 3:
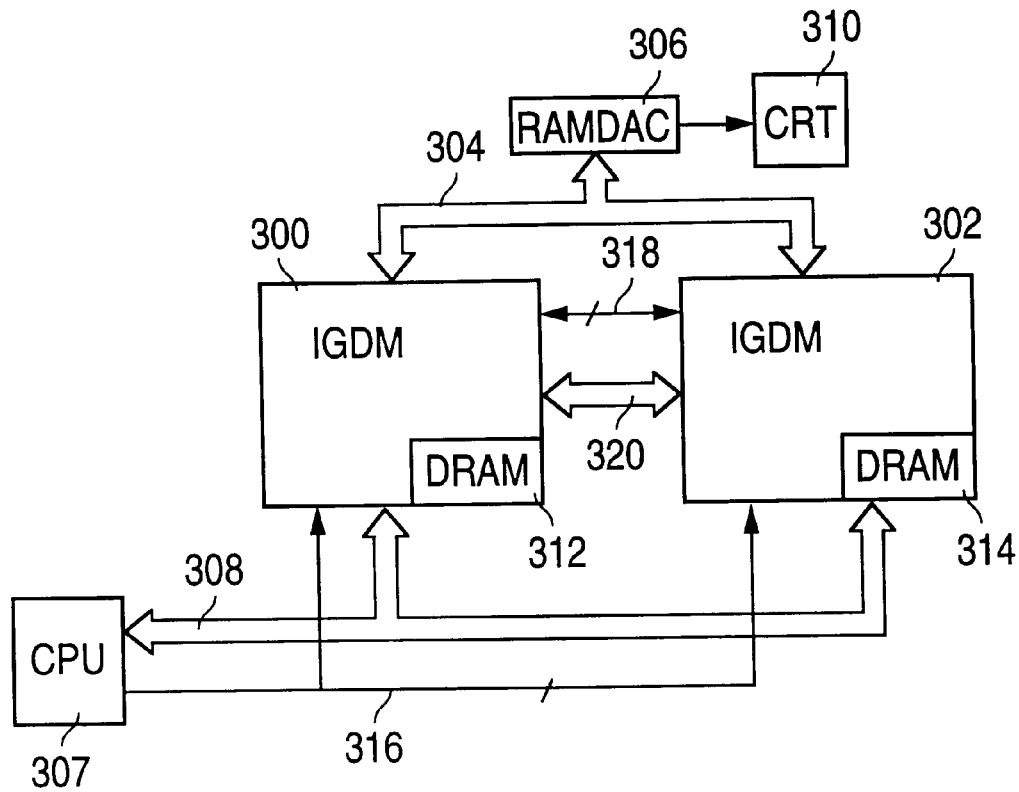
FIG. 3 is a schematic diagram illustrating a shared memory graphics accelerator system in accordance with the present invention in a distributed display arrangement.

FIG. 3 shows two integrated graphics display memory elements (IGDM) 300 and 302 connected in parallel between a display data output bus 304 and RAMDAC 306 and to CPU 307 via an address and data bus 308, without any external memory, to display a contiguous image on the CRT screen 310 using a frame buffer DRAM 312 on-chip to integrated graphics display element 300 and a frame buffer DRAM 314 on-chip to integrated graphics display element 302. Thus, the two integrated graphics display memory elements 300 and 302, provide the total frame buffer storage space for pixel display data to be displayed on the CRT screen 310. Each of integrated graphics display memory elements 300 and 302 can receive CPU instructions via the CPU control bus 316 and can display portions of the required image on the CRT screen 310. Also the two integrated graphics display memory elements 300 and 302 can communicate with each other via the control signal bus 318 and address/data path 320 to split the image or redistribute the load among themselves without CPU intervention, thereby increasing the total system performance.

One possible example of load sharing in the environment of the FIG. 3 system could arise when one integrated graphics display memory element works on even lines of the CRT display while the other integrated graphics display memory element is drawing odd lines on the CRT screen 310. Those skilled in the art will recognize that it is also possible to subdivide the CRT screen 310 even further into multiple small sections with each section being serviced by a corresponding integrated graphics display memory element; these integrated graphics display memory elements can be cascaded to display a contiguous image on the CRT screen 310.

It is well known that, the number of pixels on a CRT screen is smaller than the frame buffer size due to the aspect ratio of the CRT screen and the binary nature of the memory increments, there are always extra bits left in the frame buffer that are unused by the CRT display. During power-up of either the FIG. 2 or the FIG. 3 system, the graphics accelerator engine can check the entire frame buffer storage space for any failed bits and then map these failed bits onto the excess memory space available in the frame buffer. This becomes important since, as the combined graphics accelerator and on-chip DRAM die size increases, the number of fully functional chips drops dramatically. The excess space needed to repair the faulty frame buffer bits can be allocated from the on-chip frame buffer DRAM so that the access delay penalty occurring during the faulty bit access can be reduced, since the on-chip DRAM is much faster than off-chip DRAM. This fail bit feature can be implemented utilizing techniques disclosed in the following two co-pending and commonly-assigned applications: (1) U.S. Ser. No. 08/041,909, filed Apr. 2, 1990 now U.S. Pat. No. 5,270,974 and (2) U.S. Ser. No. 08/083,198, filed Jun. 25, 1993. Both of these applications are hereby incorporated by reference.

Figure 4:
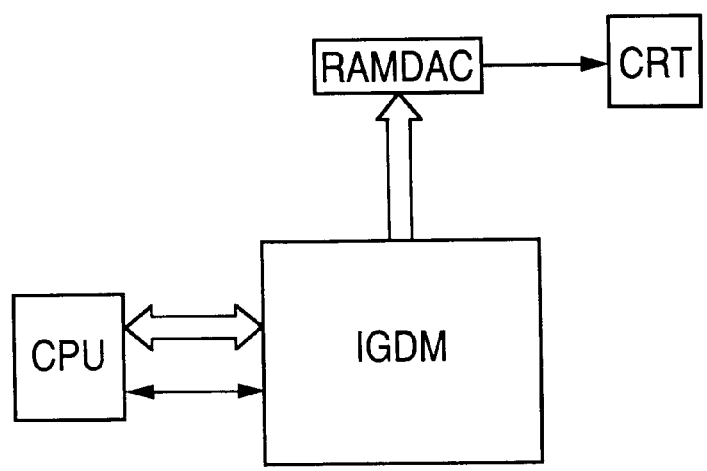
FIG. 4 is a schematic diagram illustrating a shared memory graphics accelerator system in accordance with the present invention but with no expansion memory.

As shown in FIG. 4, for smaller display sizes, a single integrated graphics display memory element without any external memory can be used initially. As the display size requirements increase, external display memory can be added in conjunction with an on-chip display memory availability. As described above, it is also possible to connect multiple integrated graphics display memory elements in parallel to meet the display size requirements and, at the same time, to execute multiple instructions in parallel, thereby increasing the CRT display performance.

It should be understood that various alternatives to the embodiment of the invention described herein may be employed in practicing the invention. It is intended that the following claims define the scope of the invention and that structures and methods within the scope of these claims and their equivalents be covered thereby.

What is claimed is:

1. An integrated graphics display memory element comprising:
   a graphics accelerator connectable to receive graphics display data and graphics command signals from an external source;
   an on-chip frame buffer memory element connected to receive graphics display data from the graphics accelerator via an internal display data distribution bus connected therebetween; and
   means, coupled to the graphics accelerator, for distributing graphics display data between the on-chip frame buffer memory element and a memory element physically separated from the integrated graphics display memory element, wherein
      a refresh frequency of the on-chip frame buffer memory element is higher than a refresh frequency of the physically separated memory element to reduce on-chip power dissipation.

2. A shared memory pixel display system that provides pixel display data to a display element for display thereby, the shared memory pixel display system comprising:
   a central processing unit that generates pixel display data and pixel commands for processing pixel display data;
   an integrated pixel display memory element that includes both a graphics accelerator connected to receive pixel display data and pixel commands from the central processing unit and an on-chip frame buffer memory element connected to receive pixel display data from the graphics accelerator via a display data distribution bus; and
   an off-chip frame buffer memory element connected to receive pixel display data from the pixel processor via the display data distribution bus;
   wherein the graphics accelerator selectively distributes pixel display data to the on-chip frame buffer memory element and to the off-chip frame buffer memory element based on pre-defined display data distribution criteria,
   wherein the display data distribution criteria are pre-defined such that the graphics accelerator selectively distributes pixel display data corresponding to images requiring a first memory access time to the on-chip frame buffer memory element and pixel display data corresponding to images requiring a second access time slower than the first access time to the off-chip frame buffer memory element, and
   wherein a refresh frequency of the on-chip frame buffer memory element is higher than a refresh frequency of the off-chip frame buffer memory element to reduce on-chip power dissipation.

3. A shared memory pixel display system as in claim 2 and wherein the on-chip frame buffer memory element has a cell size less than the cell size of the off-chip frame buffer memory element.

4. A graphics display memory system comprising:
   a graphics accelerator connectable to receive graphics display data and graphics command signals from an external source;
   an integrated frame buffer memory element formed on the same IC chip as the graphics accelerator and connected to receive graphics display data from the graphics accelerator via a display data distribution bus connected therebetween;
   an off-chip frame buffer memory element connected to the graphics accelerator via the display data distribution bus to receive graphics display data from the graphs accelerator; and
   a random access memory digital-to-analog converter (RAMDAC) connected to the display data distribution bus, for converting graphics display data received from the integrated frame buffer memory element or the off-chip frame buffer memory element via the display data distribution bus to display output signals, wherein
      a refresh frequency of the integrated frame buffer memory element is higher than a refresh frequency of the off-chip frame buffer memory element to reduce on-chip power dissipation.

5. A graphics memory system as in claim 4, wherein the RAMDAC is integrated on the same IC chip as the graphics accelerator.

6. An integrated pixel display memory element utilizable in a pixel processor system that provides pixel display data to a display element for display thereby, wherein the pixel processor system includes a central processing unit that generates pixel display data arid pixel commands for processing pixel display data and an off-chip frame buffer memory element having a first refresh frequency requirement, the integrated pixel display memory element comprising:
   a graphics accelerator that can be connected to receive pixel display data and display commands from the central processing unit via a CPU data bus and a control signal bus, respectively;

a data distribution bus connected to the pixel processor;

an on-chip frame buffer memory element connected to the data distribution bus for receiving pixel display data from the graphics accelerator; and wherein the off-chip frame buffer memory element is connectable to the data distribution bus for receiving pixel display data from the graphics accelerator; and wherein the on-chip frame buffer memory element has a second refresh frequency requirement that is higher than the first refresh frequency requirement of the off-chip frame buffer memory element to reduce on-chip power dissipation.

7. An integrated pixel display memory element as in claim 6 and wherein the graphics accelerator includes means for supporting the first and second refresh frequency requirements of the off-chip frame buffer memory element and the on-chip frame buffer memory element, respectively.

8. A shared memory pixel display system that provides pixel display data to a display element for display thereby, the shared memory pixel display system comprising:

a central processing unit that generates pixel display data and pixel commands for processing pixel display data;

an integrated pixel display memory element that includes both a graphics accelerator connected to receive pixel display data and display commands from the central processing unit and an on-chip frame buffer memory element connected to receive pixel display data from the graphics accelerator via a display data distribution bus; and an off-chip frame buffer memory element connected to receive pixel data from the graphics accelerator via the data distribution bus;

wherein the graphics accelerator selectively distributes pixel display data to the on-chip frame buffer memory element and to the off-chip frame buffer memory element based on pre-defined display data distribution criteria, and wherein a refresh frequency of the on-chip frame buffer memory element is higher than a refresh frequency of the off-chip frame buffer memory element to reduce on-chip power dissipation.

9. A shared memory pixel display system as in claim 8 and wherein the graphics accelerator further includes means for retrieving pixel display data from the off-chip frame buffer memory element for processing by the pixel processor and means for storing the processed pixel display data in the off-chip frame buffer memory element.

10. A pixel display memory system comprising:

a graphics accelerator connectable to receive pixel display data and display command signals from an external source;

an integrated frame buffer memory element formed on the same IC chip as the graphics accelerator connected to receive pixel display data from the graphics accelerator via a display data distribution bus connected the between;

an off-chip frame buffer memory element connected to the graphics accelerator via distribution bus to receive pixel display data from the graphics accelerator; and a random access memory digital-to-analog converter (RAMDAC) for converting pixel display data received from the integrated frame buffer memory element or from the off-chip frame buffer memory element to display output signals, and wherein a refresh frequency of the on-chip frame buffer memory element is higher than a refresh frequency of the off-chip frame buffer memory element to reduce on-chip power dissipation.

11. A pixel display memory system as in claim 10 and wherein the RAMDAC is integrated on the same IC chip as the graphics accelerator.

* * * * *